Aug. 5, 1941.    A. L. PARKER    2,251,717
COUPLING FOR TUBES
Filed March 29, 1939    2 Sheets-Sheet 1
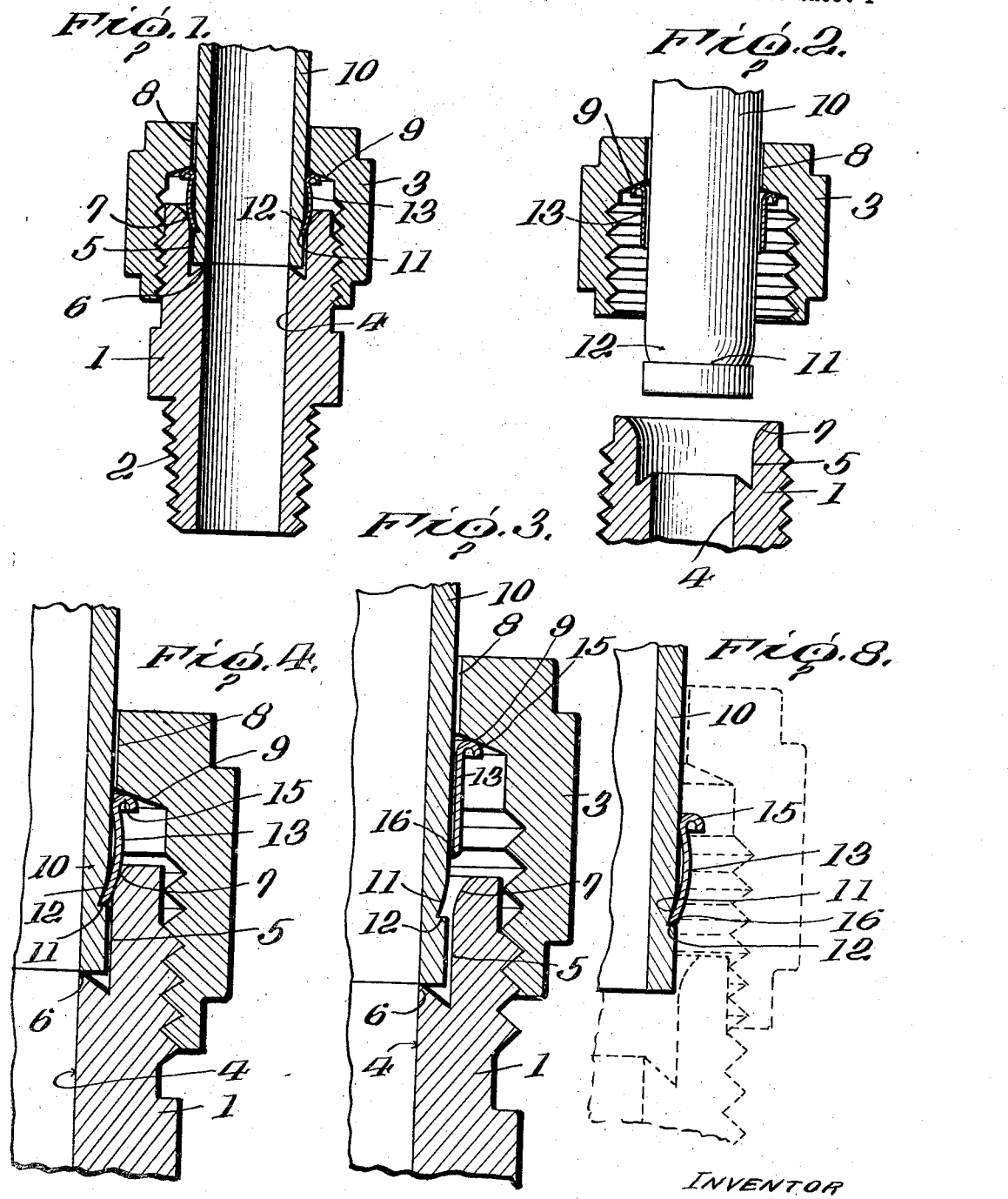
INVENTOR
Arthur L. Parker
Mason & Porter
ATTORNEYS Aug. 5, 1941.  A. L. PARKER  2,251,717
COUPLING FOR TUBES
Filed March 29, 1939     2 Sheets-Sheet 2
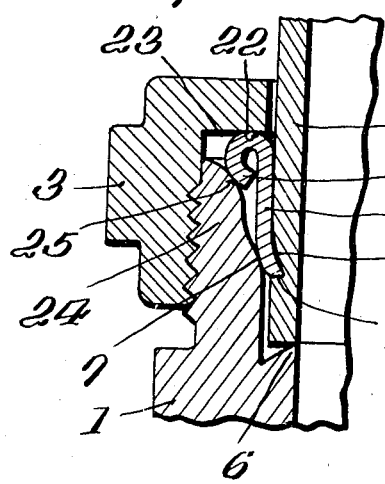
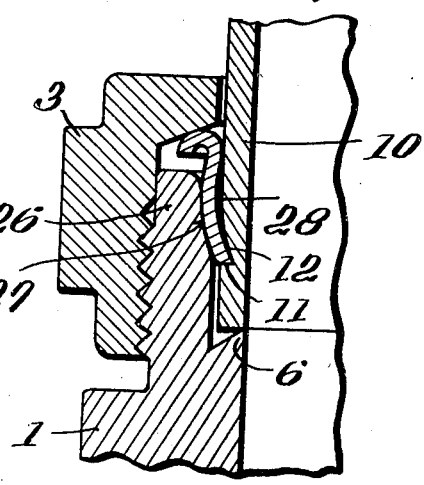
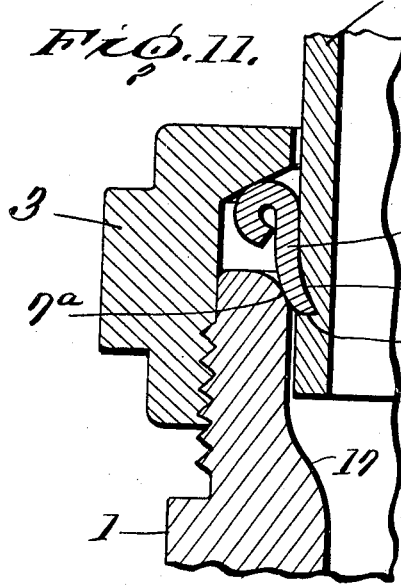
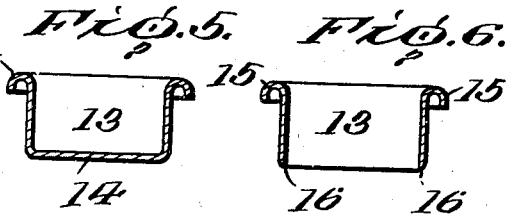
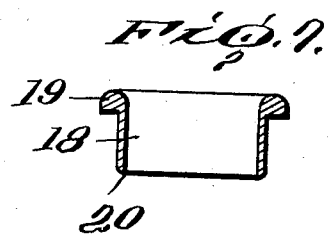
INVENTOR
Arthur L. Parker
Mason & Porter
ATTORNEYS Patented Aug. 5, 1941

2,251,717

UNITED STATES PATENT OFFICE 2,251,717

COUPLING FOR TUBES

Arthur L. Parker, Cleveland, Ohio

Application March 29, 1939, Serial No. 264,812

4 Claims. (Cl. 285—123)

The invention relates to new and useful improvements in a coupling for tubes, and more particularly a coupling for a tube end of uniform diameter wherein the holding member confined within the coupling surrounds the tube adjacent its end and holds the same in the coupling.

An object of the invention is to provide a coupling with a holding member in the form of a sleeve of relatively thin metal which is adapted to contact with a preformed shoulder in the tube for holding the tube in the coupling.

A further object of the invention is to provide a coupling of the above type wherein the coupling members are so constructed as to force the sleeve endwise and cause the advanced end thereof to be contracted and placed against the shoulder in the tube.

A still further object of the invention is to provide a coupling of the above type wherein the holding shoulder preformed in the tube lies wholly within the thickness of the wall of the tube.

A still further object of the invention is to provide a coupling of the above type wherein one of the coupling members is provided with a seal against which the end of the tube to be clamped by the coupling is seated, and wherein the holding sleeve is so shaped as to resiliently hold the tube end on its seat.

A still further object of the invention is to provide a relatively thin drawn metal holding sleeve normally of substantially uniform diameter and having an abutment member formed at one end thereof, the other end of said sleeve being adapted to be contracted so as to engage a holding shoulder on a tube to be clamped thereby in the coupling.

These and other objects will in part be obvious and will in part be hereinafter more fully disclosed.

In the drawings—

Figure 1 is a sectional view through a coupling showing a tube firmly held within the coupling by my improved tube holding means;

Figure 2 is a view showing the coupling members separated with the tube inserted through one of the coupling members and the holding sleeve preparatory to the securing of the tube to the coupling member;

Figure 3 is an enlarged sectional view showing the sleeve on the tube and in engagement with the nut preparatory to being moved forward into contact with the camming shoulder.

Figure 4 is a view similar to Figure 3, but showing the sleeve contracted and holding the tube against its seat;

Figure 5 is a sectional view showing the first step in the drawing of the holding sleeve from the blank sheet of metal;

Figure 6 is a view showing the bottom of the cup cut out and the sleeve formed ready for placement in the coupling;

Figure 7 is a sectional view showing a slightly modified form of holding sleeve which is formed by machining as distinguished from drawing;

Figure 8 is a detail in section showing the tube with the preformed shoulder and the sleeve as contracted and brought into contact with the shoulder prior to the securing of the tube to the coupling;

Figure 9 is an enlarged sectional view through the coupling showing a modified form of construction of coupling wherein the sleeve is contacted with both at the end which is contracted and at the abutment end of the sleeve;

Figure 10 is a view similar to Figure 9, but showing a further modified form of the invention wherein the sleeve throughout the greater extent of its length is contacted with by the nose of projecting end of one of the coupling members so as to limit the buckling of the sleeve;

Fig. 11 is a sectional view on an enlarged scale showing a further modified form of construction wherein the seat for the end of the tube is omitted and the camming shoulder is shaped to more quickly contract the end of the clamping sleeve;

The coupling as illustrated, embodies two members having threaded engagement with each other. One of the couplings has a bore which is slightly larger in diameter than the outer diameter of the end of the tube which is to be clamped. This bore at the entrance end thereof is flared outwardly so as to provide a camming shoulder. The tube to be clamped has a preformed shoulder therein. This shoulder may be provided in the tube in any suitable way, and is preferably disposed within the wall thicknesses of the tube so that it does not project outwardly beyond the normal diameter of the tube. It is also preferably preformed in such a way as to avoid any contracting of the inner wall of the tube. The tube is held in the coupling by a holding sleeve which is formed of thin metal. The sleeve is of substantially uniform diameter and size so as to have a loose fit on the tube. The outer end of the sleeve is rolled or bent outwardly so as to provide an abutment shoulder, while the inner end of the sleeve is adapted to be contracted, either before or during the securing of the tube to the coupling so that it is brought into contact with the preformed shoulder on the tube for holding the tube in the coupling. Preferably, the sleeve is placed on the tube and then the coupling members are threaded together, causing one of the coupling members to engage the abutment end of the sleeve and force the inner end of the sleeve into contact with the camming shoulder on the other coupling member, and it is this camming shoulder which contracts the sleeve and causes it to engage the holding shoulder on the tube.

It is thought that the invention will be better understood by a more detail description of the illustrated embodiment thereof. The coupling as a whole consists of a coupling member 1 which is provided with a threaded portion 2 adapted for attachment to any device. Associated with the coupling member 1 is a coupling member 3, and these coupling members 1 and 3 are threaded so that they may be engaged one with the other. As shown, the member 1 is in the form of a male threaded member adapted to engage within the female threaded member of the other coupling. It is understood, of course, that the coupling members may be otherwise connected, the essential feature being that some means shall be provided whereby the coupling members may be joined together for gripping and holding the end of a tube which is to be secured thereto.

The coupling member 1 is provided with a bore 4 which is of substantially the same diameter as the bore of the tube. This coupling member is provided with an enlarged bore 5 which is adapted to receive the end of the tube which is to be attached to the end of the coupling member 1.

In the preferred form of the invention, the bore 5 terminates in a shoulder 6 which is slightly inclined so as to provide a seat for the end of the tube which contacts with the tube end adjacent the inner wall of the tube. When the tube end is forced on to this inclined seat, it will make a tight contact therewith. While this seat for the end of the tube is desirable, under certain conditions it may be omitted, as will be described in detail later.

The bore 5 is flared outwardly, as indicated at 7 in Figures 3 and 4 of the drawings. This forms a curved camming shoulder, the purpose of which is to contract the end of the holding sleeve when the sleeve is forced against the same. It will be understood, of course, that this shoulder instead of being curved, may be otherwise shaped, but it is essential that it shall be shaped so as to exert a gradual contracting force on the end of the sleeve for bringing the sleeve into contact with the preformed shoulder on the tube, or for holding said contracted end of the sleeve in engagement with the shoulder, if the sleeve has been previously contracted and brought into engagement with the shoulder.

The coupling member 3 is provided with a bore 8 which is slightly larger than the outer diameter of the tube so that it fits freely on the tube. It is also provided with a shoulder 9 which is adapted to engage the abutment end of the sleeve, as will be more fully described later. The tube to be clamped is indicated at 10. This tube as clearly shown in the drawings, is provided with a shoulder 11 lying in a plane substantially at right angles to the longitudinal axis of the tube. The wall of the tube leading from the shoulder is inclined as indicated at 12 so as to gradually merge into the outer wall of the tube at a distance therefrom. This shoulder and inclined wall leading thereto may be formed in any suitable way, either by cutting away the metal, or by rolling and thus compressing and shaping the metal. Whichever way it is formed, it is preferably to so shape the tube that the shoulder shall lie within the wall thickness of the tube and so that the inner wall of the tube will not be contracted in the region of the shoulder.

The holding sleeve referred to above is indicated at 13. This holding sleeve may be formed of drawn metal, as shown in Figures 5 and 6, or it may be machined from metal, as shown in Figure 7. When it is drawn from metal, a blank of sheet metal is subjected to shaping dies for forming a cup having a bottom 14 and an outwardly rolled edge portion 15. The bottom of the cup is then cut out and this leaves more or less of a blunt edge 16 which becomes the holding edge of the sleeve in the coupling, while the rolled portion 15 becomes the abutment end of the sleeve. The blunt end of the sleeve, due to the shaping of the cup and the cutting out of the bottom, is preferably gradually curved from the inner wall of the sleeve to the outer wall of the sleeve as shown in Figures 2, 3 and 6. This sleeve, as above noted, is dimensioned so that it will make a loose fit on the tube.

Before the tube is attached to the coupling, it is preformed in the manner above described so as to provide a holding shoulder. The coupling member or nut 3 is first slipped on to the end of the tube and then the sleeve 13. The coupling members are then connected by turning one into the other, after which the tube, if there is a seat 6 formed on the coupling, is placed against the seat, as shown in Figure 3. As the threading of one coupling member on to the other continues, the curved end of the holding sleeve 13 will be brought into contact with the camming shoulder 7, and as the camming shoulder is forced on to the sleeve, it will progressively contract the sleeve and bring the holding end of the sleeve into engagement with the shoulder 11, as shown in Figure 4. During this contracting of the advanced end of the sleeve, the coupling member is usually curved slightly as shown in Figure 4. This leaves a slight clearance between the sleeve and the coupling member which is very helpful in the disconnecting of the coupling members, as it avoids the jamming of the sleeve between the tube and the camming shoulder on the coupling member. Furthermore, when the sleeve is curved away from the tube by the clamping of the end against the seat, it will yield to a limited extent, and hold the tube end tightly seated against minor vibrations. The shoulder in the tube is formed at a predetermined distance from the end of the tube so that when the coupling is turned so as to contract the inner end of the sleeve, said inner end will be brought into contact with the shoulder on the tube. The position of the shoulder is determined by the distance of the seat on the coupling member from the camming shoulder thereof.

While it is preferred to provide a seat for the end of the tube, this may not be necessary under certain conditions. In Figure 11 of the drawings, there is shown a modified form of coupling. The coupling member 1 does not have any seating shoulder, but has a gradually curved wall indicated at 17, so that there is no seat or abutment against which the tube 10 is placed. The camming shoulder 7a on the coupling member 1 is more sharply curved. The sleeve 13 when forced into contact with the camming shoulder 7a by the turning of the nut 3 will be contracted and forced into position so as to engage the shoulder 11 on the tube. Any force tending to push the tube into the coupling is resisted by the frictional grip of the contracted end of the sleeve with the inclined wall 12 of the tube.

While it is preferred to form the sleeve by drawing the same from a thin sheet of metal, it may be spun from a piece of tubing, in which case the tubing will be cut to proper length and one end thereof rolled to form an abutment, while the other end thereof is shaped to form a holding edge for engagement with the shoulder on a tube. This sleeve may be likewise machined from stock, as indicated at 18 in Figure 7, in which case the outer end of the sleeve is shaped so as to provide an abutment shoulder 19, while the inner edge of the sleeve is shaped so as to provide an edge 20 for contacting with the shoulder. This sleeve is placed on the tube in the same manner as the drawn sleeve and the inner end brought into contact with a camming shoulder which will cause it to be contracted and brought into engagement with the holding shoulder on the tube.

While the sleeve is described as being contracted by the coupling members so as to be brought into contact with the shoulder of the tube, it may be desirable to place the sleeve 13 on the tube after the nut has been placed thereon, and then contract the inner end of the sleeve so as to bring it into contact with the shoulder 11 of the tube before the other coupling member 1 is threaded into the nut. In Figure 8, the sleeve is shown as applied to the tube and preformed before the tube is attached to the coupling, so as to bring the holding end of the sleeve into engagement with the shoulder on the tube.

When the tube is preformed as described above, it may be joined to the coupling and firmly gripped thereby without requiring any great wrench pressure on the coupling members. Furthermore, the tube is not collapsed or distorted during the securing of the same to the coupling, as the nut pressure applied to the sleeve is to a large extent in a direction lengthwise of the sleeve, and the contracting of the sleeve to bring the end thereof into engagement with the shoulder is not resisted by the tube, but only by the resistance of the metal forming the end of the sleeve which is being re-shaped.

In Figure 9 of the drawings, there is shown a slightly modified form of the invention. The sleeve 13 is curled back upon itself as indicated at 21 to form an abutment shoulder 22. The nut 3 instead of having an inclined shoulder for engagement with the abutment on the sleeve is provided with a shoulder disposed substantially at right angles to the axis of the sleeve as indicated at 23. The coupling member 1 has the nose end thereof extended as indicated at 24. The camming shoulder 7 contacts with the inner end of the sleeve for contracting the same, and the curved shoulder 25 contacts with the rolled back portion 21 of the sleeve, forcing it against the sleeve intermediate the ends thereof so as to prevent buckling of the sleeve when the nut forces the same against the camming shoulder for the contracting of the end thereof. This enables the sleeve to be made of even lighter weight metal and softer metal, and still a very firm, holding grip obtained upon the tube.

In Figure 10 there is a still further modified form of the invention in that the nose end of the coupling member 1 is extended as indicated at 26 and the inner face 27 thereof is shaped so as to contract the inner end of the sleeve and also contact with the sleeve throughout a greater portion of the length thereof as it is being contracted so as to prevent buckling of the sleeve and at the same time providing a sufficient clearance 28 between the sleeve and the tube wall so that the sleeve is not wedged between the nose end of this coupling member 1 and the tube. Furthermore, the sleeve can yield slightly and will resiliently hold the tube end against its seat.

This coupling is a great improvement over the type of coupling where the tube is gripped by the member which is caused to cut into the tube. One of the advantages is the relatively small amount of wrench pressure required to deform the sleeve, due to the fact that there is no cutting of the tube by the holding sleeve. Furthermore, when the sleeve is supported against buckling, as described above, it is possible to make it of relatively soft metal, such as brass or carbon steel with a thin wall section. Then again, the grooving of the tube is especially advantageous on steel and other hard tubing, as it is difficult to obtain a sufficient cutting of the tube wall by a cutting sleeve in the coupling members as heretofore designed, so as to insure any substantial grip of the tube by the coupling.

It is obvious that many changes may be made in the details of construction and the shaping of the parts without departing from the spirit of the invention as set forth in the appended claims.

Having thus described the invention, what I claim as new and desire to secure by Letters Patent, is:

1. A coupling for a tube having a groove in its outer surface spaced away from the end of the tube and forming a holding shoulder facing away from the end of the tube, said coupling comprising a coupling member having a bore terminating at its inner end in a seat and having a camming shoulder disposed outwardly from said seat, a thin metallic sleeve disposed on said tube, said sleeve terminating at its inner end in a holding edge, a second coupling member adapted to engage the sleeve and move the same against the camming shoulder, said camming shoulder being disposed relative to the seat and the pre-formed shoulder in the tube so as to contact with the outer face of the sleeve for progressively contracting the sleeve and directing the holding edge into engagement with the shoulder on the tube whereby the end of the tube is held against said seat by pressure longitudinally of the tube.

2. A coupling for a tube having a groove in its outer surface spaced away from the end of the tube and forming a holding shoulder facing away from the end of the tube, the face of the tube leading from said shoulder being gradually inclined so as to merge into the outer face of the tube, said coupling comprising a coupling member having a bore terminating at its inner end in a seat and having a camming shoulder disposed outwardly from said seat, a thin metallic sleeve of substantially uniform thickness disposed on said tube, said sleeve at the outer end thereof being rolled outwardly to form an abutment and terminating at its inner end in a holding edge, a second coupling member adapted to engage the sleeve and move the same against the camming shoulder, said camming shoulder being disposed relative to the seat and the pre-formed shoulder in the tube so as to contact with the outer face of the sleeve for progressively contracting the sleeve and directing the holding edge into engagement with the shoulder on the tube whereby the end of the tube is held against said seat by pressure longitudinally of the tube.

3. A coupling for a tube having a groove in its outer surface spaced away from the end of the tube and forming a holding shoulder facing away from the end of the tube, the face of the tube leading from said shoulder being gradually inclined so as to merge into the outer face of the tube, said coupling comprising a coupling member having a bore terminating at its inner end in a seat and having a camming shoulder disposed outwardly from said seat, a thin metallic sleeve of substantially uniform thickness disposed on said tube, said sleeve at the outer end thereof being rolled outwardly to form an abutment and terminating at its inner end in a holding edge, a second coupling member adapted to engage the sleeve and move the same against the camming shoulder, said camming shoulder being disposed relative to the seat and the pre-formed shoulder in the tube so as to contact with the outer face of the sleeve for progressively contracting the sleeve and directing the holding edge into engagement with the shoulder on the tube whereby the end of the tube is held against said seat by pressure longitudinally of the tube, said first-named coupling member having an extension provided with means for contacting with the sleeve intermediate the ends thereof so as to prevent the sleeve from buckling when forced by the second coupling member into holding engagement with the shoulder on the tube, and the tube into sealing engagement with the seat.

4. A coupling for a tube having a groove in its outer face spaced away from the end of the tube and forming a holding shoulder facing away from the end of the tube, said coupling comprising a coupling member having a bore terminating at its inner end in a seat and having a camming shoulder disposed outwardly from said seat, a thin metallic sleeve disposed on said tube, said sleeve terminating at its inner end in a holding edge, said sleeve adjacent the holding edge being contracted to place the holding edge in engagement with the shoulder, said camming shoulder being disposed relative to the seat and the pre-formed shoulder in the tube so as to contact with the outer face of the sleeve for holding the contracted end of the sleeve in engagement with the shoulder on the tube, and a second coupling member connected to the first-named coupling member and engaging the sleeve at the outer end thereof for forcing the sleeve against said shoulder and the tube against the seat by pressure longitudinally of the tube.

ARTHUR L. PARKER.